May 29, 1934.  G. W. AMOR  1,960,405
CONNECTION OR COUPLING FOR TUBULAR BODIES
Filed Oct. 4, 1933
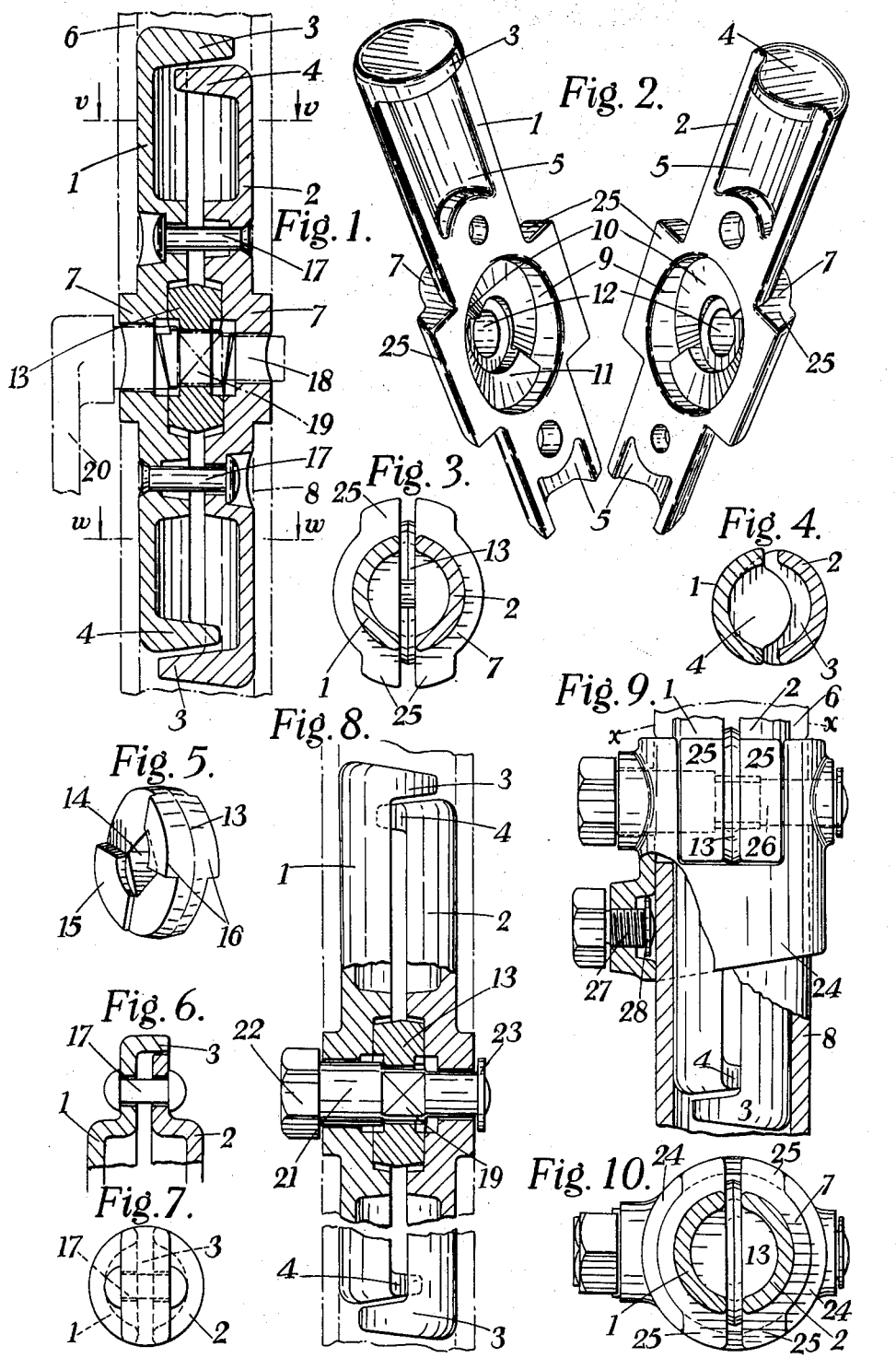
INVENTOR
George William Amor
BY
A. Knight Coval
ATTORNEY Patented May 29, 1934

1,960,405

UNITED STATES PATENT OFFICE 1,960,405

CONNECTION OR COUPLING FOR TUBULAR BODIES

George William Amor, Pollard's Hill South, Norbury, England

Application October 4, 1933, Serial No. 692,163
In Great Britain May 20, 1932

8 Claims. (Cl. 287—127)

The present invention relates to connections or couplings for tubular bodies being particularly designed for, but not necessarily limited to, use with tubular scaffold poles, and it has for its object to provide a device for connecting two tubular poles end to end and in alignment, said device being so constructed that once the several parts are assembled it is impossible, without damaging the device, to separate one or more of the parts from the device.

It has heretofore been proposed to construct a device for the purpose described comprising a pin formed longitudinally in two parts and having a loosely fitting collar disposed midway of its length and means whereby the component parts of the pin when inserted in the collar may be forced apart so that they tightly engage the tubular bodies into which the body of the pin is inserted. It has also been proposed to construct a similar device comprising a pin formed longitudinally in two parts and having a collar formed in one with said parts and a bolt, the end furthest from the head being rotatably and irremovably mounted in one of said parts, that part of the bolt passing through the other part being screw threaded, so that when the bolt is turned the parts are either forced apart or drawn together.

According to the present invention the device comprises a pin formed longitudinally into two parts adapted to be forced apart so that they tightly engage the tubes into which the body of the pin is inserted and is characterized by each part of the pin being provided at each end thereof with means adapted to cover the division between said parts. The invention further consists in the provision of an enlarged portion located approximately in the mid-centre of the length of each part, a recess formed in the inner surface of each enlarged portion, cam surfaces formed on the bottom of one or both recesses, means located within said recesses coacting with said cam surfaces and means for moving said means into and out of operation whereby the two parts of the pin are forced apart or are free to approach each other, suitable means being provided for maintaining the two parts of the pin in assembled position.

The invention still further consists in the provision of means for securing the device to one of the tubular members to be connected independently of the other member.

In the accompanying drawing which illustrates this invention:—

Figure 1 is a sectional elevation of one embodiment;

Figure 2 is a perspective view of the two halves of the device separated, the lower end of each part being broken away;

Figure 3 is a section on line $v$—$v$ of Figure 1;

Figure 4 is a section on line $w$—$w$ of Figure 1;

Figure 5 is a perspective of the cam element;

Figure 6 is a sectional elevation of the one end of the device illustrating a modification;

Figure 7 is a plan thereof;

Figure 8 is a sectional elevation of a modification;

Figure 9 is an elevation, partly in section, of a further modification, and,

Figure 10 is a plan, partly in section, on line $x$—$x$ of Figure 9.

According to the embodiment illustrated in Figures 1 to 5, the device comprises a pin formed longitudinally in two parts 1 and 2; the ends 3 and 4 of each part are formed approximately circular so that when placed together the end 3 on each part overlaps the adjacent end 4 which enters a recess 5 formed on the inner face of each part so that it is impossible for any dirt or scaling that may fall from the interior surface of the tubular scaffold members 6 to fall between the two flat faces of the pin. An enlarged portion 7 is formed approximately in the centre of each part forming a fixed collar against which the ends of the two tubular members 6 and 8 to be connected are adapted to bear. A circular recess 9 is formed in the inner or flat surface of each part and the bottom of said recess is provided with two cam surfaces 10, 11 and a centrally disposed aperture 12, the cam surfaces on the two parts being oppositely disposed. A cam element 13 furnished with a central rectangular aperture 14 and on each face with two cam surfaces 15, 16 adapted to coact with the cam surfaces 10, 11 in the recesses 9, is located within said recess. The device thus formed comprising the two halves of the pin and the cam element are connected together by rivets 17, one on either side of the collar 7, which permit of a degree of separation of the two parts.

According to the modification illustrated in Figures 6 and 7, the ends of each part may be flattened and the rivets 17 be placed through these portions, the overlapping end 3 extending from side to side so as to cover the space between the faces of the pin.

In use, assuming the scaffold member 8 to be in position, one end of the pin is placed in the end thereof; the scaffold member 6 is placed over the other end, a spindle 18 furnished with a rectangular portion 19 of the same size as the aperture 14 in the cam element 13 is passed through the apertures 12 and 14 in the pin and cam element respectively, and given a quarter turn; by this means the two parts 1 and 2 of the pin are forced apart. The spindle 18 may be removed and utilized for operating a plurality of similar devices, and may be attached to any suitable means for imparting a partial rotative movement, such as a short lever 20 placed at right angles to the spindle.

According to a modified form of the invention illustrated in Figure 8, the two halves of the pin are secured together by the operating spindle 21 which is permanently secured to the device, one end 22 of said spindle being arranged to project from the side of the device, said projecting part being of square or other suitable formation so that it may be engaged by a spanner or the like, the other end being riveted over against a washer 23. In this case the connecting rivets 17 are not required.

According to the further modification illustrated in Figures 9 and 10 the device is provided with means whereby it may be firmly secured to one of the tubular members and such means comprises a sleeve 24, the internal diameter of which is such that it fits closely over the outside of the tubular member 8; parts of the sleeve 24 are cut away so that one end thereof may interlock with projecting parts 25 provided on the collar 7; the other end, hereafter referred to as the operative end, surrounds the two parts of the pin and provides an annular space to receive the end of the tubular member 8. The sleeve 24 is permanently secured to the device by the operating spindle 26 which is made somewhat longer for this purpose. The sleeve 24 is further provided with a tapped hole to receive a set screw or bolt 27 which is preferably provided on its inner end with a washer 28 so that said bolt cannot be removed from the sleeve.

When it is desired to couple two tubular members together that end of the device having the operative end of the sleeve is inserted in one end of the tubular member 8 and the set screw or bolt 27 is screwed into contact with said tubular member; the end of the tubular member 6 is then placed over the other end of the pin and the operating spindle 26 turned to expand the pin.

This construction is particularly useful when coupling together the vertical members or standards of scaffolding in that when dismantling, assuming the coupling device to have been secured to the lower tubular member, the upper tubular member may be removed leaving the coupling device secured to the lower member from which it may be removed independently if desired, or, if the coupling device is secured to the upper member, said upper member may be removed with the coupling device attached thereto, thereby avoiding all possibility of the device being drawn out of the lower member and dropping to the ground and possibly injuring someone below.

It will be understood that while the cam element 13 has been described as having cam surfaces on both faces, one face of said element and the bottom of the recess in one of the parts of the pin may be flat, but in this case the angle of the cam surfaces on the other face and on the bottom of the recess would have to be increased to obtain the desired expansion.

What I claim is:—

1. A coupling for connecting tubular bodies end-to-end, comprising in combination, a pin formed longitudinally into two parts, means on the end of each part for covering the division between said parts, an enlarged portion formed approximately in the mid-centre of the length of each part, a recess formed in the inner surface of each enlarged portion, cam surfaces formed on the bottom of both recesses, means located within said recesses coacting with said cam surfaces, means for moving said means into and out of operation and means for maintaining said parts in assembled relation.

2. A coupling for connecting tubular bodies end-to-end, comprising in combination, a pair of tubular members, a pin formed longitudinally into two parts, means on the end of each part for covering the division between said parts, means for maintaining said parts in assembled relation, an enlarged portion formed approximately in the mid-centre of the length of each part, a recess formed in the inner surface of each enlarged portion, cam surfaces formed in said recess, a cam element located within and coacting with said cam surfaces and means for rotating said cam element to bring the cam surfaces thereon into and out of operative engagement with the cam surfaces in the recess whereby the two parts of the pin are forced into engagement with the ends of the tubular members.

3. A coupling for connecting tubular bodies end-to-end, comprising in combination, a pin formed longitudinally into two parts, means on the end of each part for covering the division between said parts, an enlarged portion formed approximately in the mid-centre of the length of each part, a circular recess formed in the inner surface of each enlarged portion, cam surfaces formed on the bottom of both recesses, a flat circular element located in said recesses having cam surfaces formed on each flat face arranged to coact with the cam surfaces in the said recesses, means for rotating said element to bring the cam surfaces thereon into and out of operation and means for maintaining said parts in assembled relation.

4. A coupling for connecting tubular bodies end-to-end, comprising in combination, a pin formed longitudinally into two parts, means on the end of each part for covering the division between said parts, an enlargement located approximately in the mid-centre of each part, a circular recess formed in the inner surface of each enlarged portion, cam surfaces formed on the bottom of both recesses, a circular aperture formed in the centre of each recess, a flat circular element located in said recesses, cam surfaces formed on both faces of said element arranged to coact with the cam surfaces in the said recesses, a rectangular aperture formed in the centre of the flat circular element, means for imparting a rotative movement to the last named element, and means for maintaining said parts in assembled relation.

5. A coupling for connecting tubular bodies end-to-end, comprising in combination, a pin formed longitudinally into two parts, means on the end of each part for covering the division between said parts, an enlargement located approximately in the mid-centre of each part, circular recesses formed in the inner surface of each enlarged portion, cam surfaces formed on the bottom of both recesses, a circular aperture formed in the centre of each recess, a flat circular element located in said recesses, cam surfaces formed on both faces of said element arranged to coact with the cam surfaces in the said recesses, a rectangular aperture formed in the centre of said element, a spindle shaped to fit the apertures in the recesses and flat circular element for imparting a rotative movement to the last named element and means for maintaining said parts in assembled relation.

6. A coupling for connecting tubular bodies end-to-end, comprising in combination, a pair of tubular members, a pin formed longitudinally into two parts, means on the end of each part for covering the division between said parts, an enlarged portion formed approximately in the mid-centre of the length of each part forming a collar against which the ends of the two tubular members are adapted to bear, means located within said enlarged portion for forcibly expanding said parts into engagement with both tubular members, means for firmly securing said pin to one of said tubular members independently of the other tubular member comprising a sleeve arranged to interlock with the enlarged portion on the pin, means for securing the sleeve to said pin and for rotating the said expanding means, comprising an irremovable spindle, and means comprising an irremovable set screw for securing said sleeve and thereby the pin to one of the tubular members.

7. A coupling for connecting tubular bodies end-to-end, comprising in combination, a pair of tubular members, a pin formed longitudinally into two parts, means on the end of each part for covering the division between said parts, means located approximately in the mid-centre of the length of each part for forcibly expanding said parts into engagement with both tubular members, means for firmly securing said pin to one of said tubular members independently of the other tubular member, and means for maintaining said parts in assembled relation.

8. A coupling for connecting tubular bodies end-to-end, comprising in combination, a pair of tubular members, a pin formed longitudinally into two parts, means on the end of each part for covering the division between said parts, an enlarged portion formed approximately in the mid-centre of the length of each part forming a collar against which the ends of the two tubular members are adapted to bear, means located within said enlarged portion for forcibly expanding said parts into engagement with both tubular members, means for firmly securing said pin to one of said tubular members independently of the other tubular member comprising a sleeve interlocking with the enlarged portion on the pin, means for securing the sleeve to said pin and means for securing said sleeve and thereby the pin to one of the tubular members.

GEORGE WILLIAM AMOR.